Patented Mar. 5, 1946

2,395,956

UNITED STATES PATENT OFFICE 2,395,956

PROCESS FOR THE RECOVERY OF UNSATURATED HYDROCARBONS FROM MIXTURES CONTAINING THE SAME

Frank J. Soday, Swarthmore, Pa., assignor to The United Gas Improvement Company, a corporation of Pennsylvania No Drawing. Application September 3, 1942,
Serial No. 457,187

14 Claims. (Cl. 260—677)

This invention pertains generally to the recovery of unsaturated hydrocarbons from mixtures containing the same and pertains particularly to such operations wherein solid dry salts of metals of groups 1B and 2B of the periodic system are employed.

I have found that when solid dry salts of the character described (that is salts substantially free from water) are employed for this purpose and whether or not the mixture containing the unsaturated hydrocarbons is in the liquid or vapor phase, there is a distinct tendency for polymerization and other side reactions to take place resulting not only in a loss of unsaturated hydrocarbon material but frequently also deposits upon the particles of solid dry reagent. Such deposits not only reduce the activity of the reagent particles but also greatly increase the tendency for the particles to coalesce with a further reduction in activity and a substantial increase in operating difficulties.

I have discovered that side reactions of the character described as well as the deposition of reaction products upon the reagent particles may be very substantially reduced or prevented by mixing with the solid dry reagent a polymerization inhibitor for unsaturated hydrocarbons in combination with an organic or inorganic basic substance or an anhydride thereof, such as an alkali metal and/or of an alkaline earth oxide or hydroxide.

Solid dry salts of metals of groups 1B and 2B of the periodic system and particularly monovalent salts of heavy metals of these groups, such as halides, nitrates, sulfates, phosphates, formates, acetates, propionates, carbonates and lactates of copper, mercury and silver may be employed for the removal or recovery from hydrocarbon mixtures, either in the vapor or liquid phase, of diolefines and/or olefines by the formation of an association product of one or more of said unsaturated hydrocarbons with one or more of said salts under suitable temperature and pressure conditions, which association product may be afterward dissociated such as by an elevation in temperature and/or reduction in pressure, usually after separation from the unreacted material, to regenerate the unsaturated hydrocarbon or hydrocarbons and the reagent salt.

For reaction efficiency and ease of handling, it is very desirable to maintain the solid dry reagent in finely divided form and with surfaces uncoated with secondary reaction products.

Furthermore, that portion of the reagent which becomes coated with secondary reaction products represents a loss in reagent itself. When present in considerable quantity, it may reduce the activity of the reagent to such an extent as to require a complete renewal thereof with fresh material.

I have discovered that the useful life of such reagent may be extended even further by the addition thereto of an inorganic and/or organic basic material in combination with a polymerization inhibitor. The improved results obtained by the use of such combination far exceeds that which could reasonably be expected on the basis of the results obtained by the use of either agent alone, indicating that the presence of each material enhances the protective activity of the other material.

By the operation of my inveniton the useful life of the reagent is greatly extended and the loss of unsaturated hydrocarbons by virtue of side reactions is greatly reduced.

Under suitable conditions of temperature and pressure, diolefines may be made to selectively react with reagents of the type described in preference to olefines.

Furthermore, any two or more of these classes of hydrocarbons may be caused to react with a mass of reagent salt to form a plurality of association products which, since they have different dissociation pressures, may be dissociated selectively, such as stagewise, to yield each class of hydrocarbon in more concentrated form.

Moreover, any of these classes of unsaturated hydrocarbons may be selectively removed from mixtures containing other materials.

In some instances, the tendency to form solid or semi-solid secondary reaction products by polymerization or otherwise is very pronounced and when the reagent is in a solid dry form such secondary reaction products are deposited upon the reagent particles. Such deposits not only prevent the mixture undergoing treatment from coming into proper contact with reagent particles thus coated but also tend to cause the reagent particles to agglomerate to introduce processing and handling difficulties.

While any desired organic inhibitor may be mixed with the reagent salt, and the organic and/or inorganic basic substance, I prefer to select such materials which are either inert with respect to the reagent salt or of very low reactivity therewith.

I also prefer to employ inhibitors of relatively low volatility in order that they may be retained over a longer period in admixture with the reagent salt without necessity of unduly large make-up, and without undue admixture of volatilized inhibitor with recovered unsaturated hydrocarbons.

In the event that the inhibitor reacts to an appreciable extent with the salts, it is preferred that such reaction product be of low vapor pressure.

In addition, if desired, the inhibitor may be so chosen so that any salt formed therewith may have little tendency to hydrolyze in the presence of moisture, the presence of which is substantially unavoidable in industrial operations of the character under discussion.

Examples of inhibitors which may be admixed with reagent salts of the type set forth herein are as follows:

1. Aryl amines and aryl nitrogen containing inhibitors, such as
   Alpha naphthylamine
   Thio diaryl amine
   Beta-naphthylamine
   p-Phenylenediamine
   2,4-diamino diphenylamine
   o-Phenylene diamine
   Phenyl hydrazine
   Benzamide
   Cyclohexyl naphthylamine Particularly desirable results have been obtained by the use of secondary aryl amines having the following general formula:

in which $R_1$ is a substituted or an unsubstituted aryl, aralkyl, cycloparaffinic, cyclo-olefinic, hydroaromatic, or naphthenic ring or group, and in which R is a substituted or an unsubstituted aryl, aryl-alkyl, alkyl-aryl, alkyl, cycloparaffinic, cycloolefinic, hydroaromatic, or naphthenic ring or group. Included are secondary amines such as, for example,

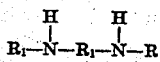

and

in which R and $R_1$ have the same meaning as before.

Secondary amines containing one or more aryl or substituted aryl groups are preferred, such as
   Diphenyl-p-phenylenediamine,
   Phenyl-beta-naphthylamine,
   Isopropoxydiphenylamine,
   Aldol-alpha-naphthylamine (and polymers thereof),
   Symmetrical di beta naphthyl-p-phenylenediamine,
   Trimethyl dihydroquinoline (and polymers thereof),
   Ditolyamines, and mixtures thereof.

2. Phenolic compounds, such as
   Dihydroxybenzenes, and substituents thereof
   Pyrogallol, and substituents thereof
   Pyrocatechol
   Resorcinol
   Xylenols
   Catechol
   Trihydroxybenzene, and substituents thereof
   Nitrosophenol
   Diaminophenol
   Alpha-naphthol
   Dihydroxynaphthalene
   Hydroxy quinoline
   Hydroxy tetrahydroquinoline
   Polyhydric phenols
   Polyhydroxy phenanthrene
   4-nitroso-2-methyl phenol.

3. Compound inhibitors, such as
   Acyl-substituted amino phenols
   4-cyclohexyl amino phenol
   p-Amino phenol
   o-Amino phenol
   5-amino-2-hydroxytoluene.

4. Miscellaneous inhibitors, such as
   Hydroquinone
   Quinol
   Nitroso naphthols
   Quinhydrone
   Reaction product of an aldehyde and an amine
   p-Amino acetophenone
   Dihydroxy anthraquinone
   Condensation product of a ketone with an amine.

Excellent results have been obtained when one or more inhibitors selected from a list comprising phenyl beta-naphthylamine, p-tertiary butyl catechol, alkylated polyhydroxy phenol, hydroquinone, aldehyde-amine reaction product, ketone-amine reaction product, and n-butyl-p-amino phenol are employed as polymerization inhibitors.

When one or more of such inhibitors are used, I prefer to employ between 0.1 per cent and 10 per cent by weight of inhibitor to solid reagent salt.

Excellent results are obtained when less than 5%, and more particularly 2 per cent or less by weight of inhibitor are employed.

Examples of organic basic materials which may be admixed with reagent salts of the type set forth herein in combination with an inhibitor are as follows:

A. Primary, secondary and tertiary alkyl amines such as methyl amine, dimethyl amine, trimethyl amine, ethyl amine, diethyl amine, triethyl amine, propyl amine, butyl amine, amyl amine, etc.

B. Primary, secondary and tertiary hydroxy alkyl amines, such as monoethanolamine, diethanolamine and triethanolamine.

C. Aromatic amines such as aniline (phenyl amine), ortho toluidine, meta toluidine, para toluidine, benzylamine, methyl aniline, dimethyl aniline, diethyl aniline, benzyl aniline, acetanilide aceto-acetanilide, 1,2,3-xylidine, 1,2,4-xylidine, 1,3,2-xylidine, 1,3,4-xylidine, 1,3,5-xylidine, 1,4,2-xylidine and aryl amines in general.

D. Alkyl and aryl hydroxyl amines such as beta phenyl hydroxyl amine, alpha methyl hydroxyl amine, and beta methyl hydroxyl amine.

E. Aliphatic and aromatic quaternary ammonium bases such as alkyl and aryl ammonium hydroxides, for example, tetramethyl ammonium hydroxide; phenyl trimethyl ammonium hydroxide, benzyl trimethyl ammonium hydroxide, etc.

F. Alkyl and aryl hydrazines, such as primary hydrazines, for example, methyl hydrazine and ethyl hydrazine; unsymmetrical dialkyl hydrazines, for example, unsymmetrical dimethyl hydrazine and unsymmetrical diethyl hydrazine; phenyl hydrazine and methyl phenyl hydrazine. Many of these compounds have the added advantage of being powerful reducing agents, thus tending to insure the presence of reagent salt in monovalent form.

G. Amine oxides such as trimethyl amine oxide.

H. Cyclic tertiary bases such as pyridine, quinoline, isoquinoline, acridine, alpha, beta and gamma picoline, dimethyl-pyridines, trimethyl pyridines, hydrogenated pyridines, for example, piperidine.

Examples of inorganic basic materials which may be admixed with reagent salts of the type set forth herein in combination with an inhibitor are as follows:

A. Alkali metal oxides, hydroxides and carbonates such as $Na_2O$, $Na_2O_2$, $Na_2O_3$, $K_2O$, $K_2O_2$, $K_2O_3$, $K_2O_4$, $Rb_2O$, $Rb_2O_2$, $Rb_2O_3$, $Rb_2O_4$, $Cs_2O$, $Cs_2O_2$, $Cs_2O_3$, $Cs_2O_4$, $Li_2O$, $Li_2O_2$, NaOH, KOH, RbOH, CsOH, LiOH, $NaHCO_3$, $Na_2CO_3$, $KHCO_3$, $K_2CO_3$, $LiHCO_3$, $Li_2CO_3$, $RbHCO_3$, $Rb_2CO_3$, $CsHCO_3$, and $Cs_2CO_3$. Since the radical "ammonium," namely, $NH_4$, behaves in its compounds as a univalent alkali metal, ammonium compounds are for convenience grouped with those of the alkali metals. Suitable ammonium compounds for use in my invention are $NH_4HCO_3$, $(NH_4)_2CO_3$, $NH_4OCONH_2$.

B. Alkaline earth oxides, hydroxides and carbonates such as CaO, $CaO_2$, $Ca(OH)_2$, $Ca(HCO_3)_2$, $CaCO_3$, BaO, $BaO_2$, $Ba(OH)_2$, $BaCO_3$, SrO, $SrO_2$, $Sr(OH)_2$, $SrCO_3$, BeO, $Be(OH)_2$, $BeCO_3$, MgO, $Mg(OH)_2$, and $MgCO_3$.

Particularly desirable results are obtained when alkali and/or alkaline earth oxides are employed as the basic substance, such as BaO and particularly CaO.

Any desired quantity of basic material may be incorporated with the solid reagent salt in combination with an inhibitor, whether the basic material is in the form of a solid or in the form of a liquid.

In the case of liquid additives, however, it is preferred that the reagent salt shall retain solid characteristics or, in other words, that it shall not be suspended or floated in a continuous liquid phase as is the case with a slurry.

As a rule between 0.1 per cent to 10 per cent by weight of basic material to solid reagent salt will give improved results, the exact amount required for optimum conditions depending somewhat upon the degree of moisture present in the hydrocarbon mixture to be treated. The use of 5%, or less, of basic material will be found to give excellent results in practically all cases.

Since such hydrocarbon mixtures are for the most part substantially dry and usually contain hardly more than traces of moisture, four per cent by weight of basic substance based upon solid dry reagent salt present will usually be very satisfactory.

The reagent is preferably maintained in finely divided form throughout the process of absorption and desorption, and for this purpose the process may be practiced in suitable apparatus for example, a ball mill or similar device (especially adapted if necessary for this purpose), with the material being treated in either the liquid phase or the vapor phase or both.

Examples of the use of an inhibitor in combination with an alkaline agent for the concentration of diolefines with solid dry salts of metals of groups 1B and 2B of the periodic system are as follows:

*Example 1*

A 200 gram portion of a light oil butadiene fraction containing 50% butadiene was reacted with 1600 grams of dry cuprous chloride powder containing 2% phenyl beta-naphthylamine and 4% calcium oxide at a temperature of 0° C. for a period of 20 minutes, while thoroughly agitating the mass to maintain the reagent in finely divided form, after which the temperature of the reaction mixture was increased to 25° C., resulting in the removal of the olefinic and paraffinic constituents. Upon raising the temperature to 50° C., a material having the same composition as the charging stock was obtained.

Finally, upon heating to temperatures of 60° C., and above, 75% of the butadiene present in the original fraction is recovered in the form of a 98% product.

This process was repeated with the same reagent for a total of 130 consecutive concentrating cycles, at the end of which time the results obtained were equally as satisfactory as that obtained in the first concentration operation.

*Example 2*

A 70% light oil isoprene fraction, containing 24% amylenes and 6% pentanes, is reacted with dry, finely powdered cuprous chloride containing 0.25% by weight of alkylated polyhydroxy phenol and 4% calcium oxide for a period of one hour at a temperature of 0° C. The temperature of the reaction mixture then is increased to 25° C., under reduced pressure, resulting in the removal of the major portion of the olefinic and paraffinic constituents present.

Upon heating to a temperature of 50° C., a small quantity of an intermediate fraction is secured, after which the temperature was increased to 65° C. Approximately 70% of the isoprene present in the original fraction is isolated in the form of a 98% product.

*Example 3*

A 75% piperylene fraction, containing 20% amylenes and 5% pentanes is contacted with dry, finely powdered cuprous chloride containing 1% by weight of the reaction product of acetone and aniline, and 4% calcium oxide at a temperature of 10° C. for a period of 1 hour. The absorbent then is heated to 30° C., under reduced pressure, resulting in the isolation of a concentrated olefine fraction. Upon heating to 55° C., an intermediate fraction is secured in small quantities.

Finally, heating the absorbent to a temperature of 65° C. results in the isolation of 70% of the piperlyene present in the original fraction in the form of a 98% product.

Any desired quantity of inhibitor and basic material may be incorporated with the solid reagent salt whether the inhibitor and/or basic material is in the form of a solid or in the form of a liquid.

In the case of liquid additives, however, it is preferred that the reagent salt shall retain solid characteristics or, in other words, that it shall not be suspended or floated in a continuous liquid phase as the case with a slurry.

The solid reagent salt per se may be said to be dispersed since it is employed in a disintegrated form, for example, in the form of a powder to form a mass with considerable free space between the particles thereof.

When the reagent salt is mixed with a liquid inhibitor and/or liquid basic material, it is preferred to retain a substantial part of this free space. Accordingly, the proportion of liquid inhibitor and/or liquid basic material to solid salt preferably should not be sufficient to form a continuous liquid phase with solid salt particles dispersed therein, but preferably should be restricted to such quantity that the liquid itself may be said to be dispersed along with the solid in which condition there may be said to be retained in the mass a degree of free space between the wetted particles thereof.

Thus the reagent when treated with a liquid or liquids differs from a slurry in that it is not freely flowing or pumpable as is the case with a slurry.

However, the reagent may be used in the form of a slurry and/or solution without departing from the broader concept of my invention.

The advantages of having my new reagent in solid, substantially dry, finely divided form are so outstanding as to make this form of the invention particularly preferred and different from the other forms, whether the material undergoing treatment is in the liquid phase or the vapor phase.

A manner of assuring a substantially non-aqueous system is to subject the mixture undergoing treatment either in the liquid or vapor phase to a drying action prior to contacting with the solid salt in accordance with my invention, that is, prior to contact with the solid salt in the presence of a basic substance and an inhibitor. Thus, the material to be treated may be first contacted, for example, with calcium oxide to substantially reduce its moisture content prior to contact with the reagent mass comprising solid salt, a basic substance, and an inhibitor.

An outanding feature of my invention is that it is preferably carried out in a substantially non-aqueous system, or in other words in the substantial absence of water. Since in industrial processes of this general character the presence of some moisture is unavoidable, such moisture preferably should not be permitted to accumulate in quantities greater than 2% by weight of the solid dry salt, and more preferably, not greater than 1% by weight of said salt. Substantially lower tolerances are recommended.

Conceivably, larger quantities of water may be present with the realization of some of the advantages of my invention, but with the sacrifice of others.

In the case of a solid inhibitor and/or solid basic material which is preferably disintegrated the same as the reagent salt, any proportion may be mixed with the reagent salt without danger of filling up the free space between the particles thereof.

I find that as a rule between 0.1 per cent and 10 per cent by weight of inhibitor to solid reagent salt containing basic material will give improved results. I find that for most purposes 5%, or even less, for example 2%, is ample.

I find also that between 0.1 per cent and 10 per cent by weight of basic material to solid reagent salt containing inhibitor will give improved results, the exact amount required for optimum conditions depending somewhat upon the degree of moisture present in the hydrocarbon mixture to be treated. The use of 5% or even less of basic material will be found to give excellent results in practically all cases.

Processes of the general character to which my new reaction mass may be applied relate for the most part to the selective recovery of unsaturated hydrocarbons of less than seven carbon atoms from mixtures thereof, although they are not limited thereto.

Frequently, it is found to be technically advantageous to first resort to fractional distillation or other means to narrow the boiling range of the mixture.

Thus a $C_5$ cut may be treated to separate diolefines from olefines or a distillate fraction containing substantially no other diolefine but say isoprene or piperylene may be treated to segregate the respective diolefine from olefinic and any paraffinic material which might be present.

Likewise, a $C_4$ cut containing butadiene, butene and perhaps traces of butane may be treated to segregate the butadiene in high concentration.

A $C_3$ cut or a $C_2$ cut might be treated to segregate propylene or ethylene respectively in high concentration.

The diolefines present in a given fraction may be contacted with my reaction mass under conditions of temperature and pressure such that substantially only diolefine materials are absorbed by the reaction mass. Then after removal of unreacted material the complex formed between the diolefine material and the reaction mass may be decomposed by elevation in temperature and/or reduction in pressure to revivify the reaction mass and to regenerate the diolefine material.

On the other hand, both olefines and diolefines may be absorbed simultaneously and separated from each other by regulation of temperature and/or pressure during dissociation as already referred to.

The recovery of $C_5$ diolefine material from a mixture thereof containing other hydrocarbons by contacting the same with a solid dry salt of a heavy metal of groups 1 and 2 of the periodic system, is described in the copending application of Frederick W. Breuer, Serial Number 345,101, filed July 12, 1940, which has matured into Patent 2,359,020, granted September 26, 1944, and the recovery of butadiene from a mixture thereof containing other hydrocarbons by contacting the same with solid cuprous chloride is described in Chemical Abstracts, vol. 32, 6098–6100 (1938).

The recovery of olefines from hydrocarbon mixtures containing the same by contacting said mixtures with solid dry salts of the character referred to herein is described in U. S. Patent 2,116,157, dated May 3, 1938, and U. S. Patent 2,209,452, dated July 30, 1940.

My new reaction mass may be substituted in any of the foregoing processes with the advantages set forth herein.

If desired, any one or more inhibitors and/or alkaline materials may be applied to the solid salt in the form of a solution or suspension in a liquid, if desired, due care preferably being taken that any liquid in the reaction mass when ready for use is in the dispersed phase as distinguished from the continuous phase.

As indicated previously, one or more inhibitors and one or more alkaline agents may be employed for my purpose. When two or more inhibitors and/or alkaline agents are employed, all may be solids all may be liquids, or a part may be solid and a part liquid.

A number of solid dry salts of groups 1B and 2B of the periodic system may be employed for concentrating olefines, and particularly diolefines, the monovalent salts being preferred. Excellent results may be obtained by the use of one or more monovalent salts of silver, copper, or mercury.

Where various procedures have been particularly described, these are of course subject to considerable variation. Therefore, it will be understood that the foregoing specific examples are given by way of illustration, and that changes, omissions, additions, substitutions, and/or modifications might be made within the scope of the claims without departing from the spirit of the invention, which is intended to be limited only as required by the prior art.

I claim:

1. A process for recovering unsaturated hydrocarbon material selected from the group consisting of olefines and diolefines from a mixture containing the same and other hydrocarbon material which comprises contacting said mixture in the presence of a polymerization inhibitor and a solid inorganic basic substance with at least one solid monovalent salt of a metal selected from the group consisting of silver, copper, and mercury to form a complex between said compound and said salt, said contact taking place in the absence of more than 2% by weight of water based on solid dry salt, separating unreacted hydrocarbon material from said complex, and decomposing said complex to recover said selected unsaturated hydrocarbon material.

2. A process for concentrating diolefine material present in a light oil diolefine fraction containing other hydrocarbon material comprising contacting said fraction in a substantially non-aqueous system with a reagent comprising at least one finely divided solid monovalent salt of a metal selected from the group consisting of copper, silver, and mercury, a polymerization inhibitor and a solid inorganic basic substance to form a complex between said diolefine material and said salt, separating unreacted hydrocarbon material from said complex, and decomposing said complex to recover said diolefine material in more concentrated form.

3. A process for concentrating diolefine material present in a light oil diolefine fraction containing other hydrocarbon material comprising contacting said fraction with at least one finely divided solid monovalent salt of a metal selected from the group consisting of copper, silver, and mercury in the presence of less than 2% of moisture based on said solid dry salt and in the presence of an aryl amine and a solid inorganic basic substance to form a complex between said diolefine material and said salt, separating unreacted hydrocarbon material from said complex, and decomposing said complex to recover said diolefine material in more concentrated form.

4. A process for concentrating diolefine material contained in a light oil diolefine fraction together with other hydrocarbon material comprising contacting said fraction with at least one finely divided solid monovalent salt of a metal selected from the group consisting of copper, silver, and mercury in the presence of less than 1% of moisture based on solid dry salt and in the presence of a phenolic polymerization inhibitor and a solid inorganic basic substance to form a complex between said diolefine material and said salt, separating unreacted hydrocarbon material from said complex and decomposing said complex to recover said diolefine material in more concentrated form.

5. A process for concentrating diolefine material contained in a light oil diolefine fraction together with other hydrocarbon material comprising contacting said fraction with at least one finely divided solid monovalent salt of a metal selected from the group consisting of copper, silver, and mercury in the presence of less than 1% of moisture based on solid dry salt and in the presence of an alkylated polyhydroxy phenol and a solid inorganic basic substance to form a complex between said diolefine material and said salt, separating unreacted hydrocarbon material from said complex and decomposing said complex to recover said diolefine material in more concentrated form.

6. A process for concentrating diolefine material contained in a light oil diolefine fraction together with other hydrocarbon material comprising contacting said fraction with at least one finely divided solid monovalent salt of a metal selected from the group consisting of copper, silver, and mercury in the presence of less than 1% of moisture based on solid dry salt and in the presence of tertiary butyl catechol and a solid inorganic basic substance to form a complex between said diolefine material and said salt, separating unreacted hydrocarbon material from said complex and decomposing said complex to recover said diolefine material in more concentrated form.

7. A process for concentrating diolefine material contained in a light oil diolefine fraction together with other hydrocarbon material comprising contacting said fraction with at least one solid monovalent salt of a metal selected from the group consisting of copper, silver, and mercury in the presence of less than 1% of moisture based on solid dry salt and in the presence of hydroquinone and a solid inorganic basic substance to form a complex between said diolefine material and said salt, separating unreacted hydrocarbon material from said complex and decomposing said complex to recover said diolefine material in more concentrated form.

8. A process for recovering butadiene from a light oil fraction containing the same together with other hydrocarbon material comprising contacting said fraction with solid cuprous chloride in the presence of less than 1% of moisture based on solid dry cuprous chloride and in the presence of a polymerization inhibitor and calcium oxide to form a butadiene-cuprous chloride complex, separating unreacted hydrocarbon material from said complex, and decomposing said complex to recover said butadiene in more concentrated form.

9. A process for recovering isoprene from a light oil fraction containing the same together with other hydrocarbon material comprising contacting said fraction with solid cuprous chloride in the presence of less than 1% of moisture based on solid dry cuprous chloride and in the presence of a polymerization inhibitor and calcium oxide to form an isoprene-cuprous chloride complex, separating unreacted hydrocarbon material from said complex, and decomposing said complex to recover said isoprene in more concentrated form.

10. A process for recovering piperylene from a light oil fraction containing the same together with other hydrocarbon material comprising contacting said fraction with solid cuprous chloride in the presence of less than 1% of moisture based on solid dry cuprous chloride and in the presence of a polymerization inhibitor and calcium oxide to form a piperylene-cuprous chloride complex, separating unreacted hydrocarbon material from said complex, and decomposing said complex to recover said piperylene in more concentrated form.

11. A process for concentrating diolefine material in a light oil diolefine fraction containing conjugated diolefine material of from 4 to 5 carbon atoms per molecule containing conjugated diolefine material in admixture with other hydrocarbon material including olefine material having from 4 to 5 carbon atoms per molecule comprising contacting said fraction with at least one solid monovalent salt of a metal selected from the group consisting of copper, silver, and mercury in the presence of a polymerization inhibitor and a solid inorganic basic substance and in the absence of more than 1% of water based on solid dry salt to form at least one complex between said salt and said olefine material and said diolefine material, separating unreacted hydrocarbon material from said complex, and decomposing said complex by heating in a stepwise manner to recover a concentrated olefine fraction and a concentrated diolefine fraction.

12. A process for concentrating butadiene in a light oil butadiene fraction containing butadiene in admixture with other hydrocarbon material including olefine material comprising contacting said fraction with solid cuprous chloride in the presence of less than 1% moisture based on solid dry cuprous chloride and in the presence of phenyl-beta-naphthylamine and calcium oxide to form a complex between cuprous chloride and said butadiene and a complex between cuprous chloride and said olefine material, separating unreacted hydrocarbon material from said complexes and thereafter decomposing said complexes by heating in a stepwise manner to produce a concentrated olefine fraction and a concentrated butadiene fraction.

13. A process for concentrating butadiene in a light oil butadiene fraction containing butadiene in admixture with other hydrocarbon material including olefine material comprising contacting said fraction in a substantially non-aqueous system with solid cuprous chloride in the presence of p-tertiary butyl catchol and calcium oxide to form a complex between cuprous chloride and said butadiene and a complex between cuprous chloride and said olefine material, separating unreacted hydrocarbon material from said complexes, and thereafter decomposing said complexes by heating in a stepwise manner to produce a concentrated olefine fraction and a concentrated butadiene fraction.

14. A process for concentrating butadiene in a light oil butadiene fraction containing butadiene in admixture with other hydrocarbon material including olefine material comprising contacting said fraction in a substantially non-aqueous system with solid cuprous chloride in the presence of an alkylated polyhydroxy phenol and calcium oxide to form a complex between cuprous chloride and said butadiene and a complex between cuprous chloride and said olefine material, separating unreacted hydrocarbon material from said complexes and thereafter decomposing said complexes by heating in a stepwise manner to produce a concentrated olefine fraction and a concentrated butadiene fraction.

FRANK J. SODAY.